US006152971A

United States Patent [19]

Miyanowaki et al.

[11] Patent Number: 6,152,971

[45] Date of Patent: Nov. 28, 2000

[54] ELECTRODE PLATE FOR SECONDARY BATTERY WITH NONAQUEOUS ELECTROLYTE AND PROCESS FOR PRODUCING SAME

[75] Inventors: Shin Miyanowaki; Yuichi Miyazaki, both of Shinjuku-ku, Japan

[73] Assignee: Dai Nippon Printing Co., Ltd., Tokyo-to, Japan

[21] Appl. No.: 08/964,644

[22] Filed: Nov. 5, 1997

[30] Foreign Application Priority Data

Nov. 6, 1996 [JP] Japan .................................... 8-308665

[51] Int. Cl.[7] ...................................................... H01M 4/02

[52] U.S. Cl. ............................................ 29/623.5; 429/209

[58] Field of Search ..................................... 429/211, 233, 429/209; 29/623.1, 623.5, 2, 730; 204/280, 290 R

[56] References Cited

U.S. PATENT DOCUMENTS

| | | | |
|---|---|---|---|
| 5,419,982 | 5/1995 | Tura et al. | 429/162 |
| 5,480,462 | 1/1996 | Tuttle | 29/623.5 |
| 5,612,153 | 3/1997 | Moulton et al. | 429/191 |

FOREIGN PATENT DOCUMENTS

| | | |
|---|---|---|
| 61-181061 | 8/1986 | Japan . |
| 8-124548 | 5/1996 | Japan . |

*Primary Examiner*—Carol Chaney
*Assistant Examiner*—Susy Tsang
*Attorney, Agent, or Firm*—Ladas & Parry

[57] ABSTRACT

The present invention provides an electrode plate for a secondary battery with a nonaqueous electrolyte, and a process for producing same capable of forming accurately and economically the active material layer on the collector surface. The process comprises the steps of: (1) applying a peelable material on a predetermined area of a collector surface, and drying same to form a peelable layer; (2) applying an electrode forming composition comprising an active material and a binder on the collector surface to form an active material layer lying over at least one area of the peelable layer previously formed; and (3) peeling the peelable layer from a collector together with a portion of the active material layer disposed on the peelable layer to partially expose the collector surface, thereby forming a noncoated portion having a predetermined pattern on the collector surface.

7 Claims, 11 Drawing Sheets

11
12
16
13
14
2
20
19
24
21
17
22
18
23
X
Y

ELECTRODE PLATE FOR SECONDARY BATTERY WITH NONAQUEOUS ELECTROLYTE AND PROCESS FOR PRODUCING SAME

BACKGROUND OF THE INVENTION

1. Field of the Invention

The present invention relates to an electrode plate for a secondary battery with a nonaqueous electrolyte (referred to "electrode plate" hereinafter), for example, represented by a lithium ion secondary battery and also relates to a process for producing such an electrode plate. In particular, it relates to the process for producing the electrode plate which is capable of economically forming an active material layer and a noncoated portion in accordance with a predetermined pattern on a collector surface, and the electrode plate produced by such a process.

2. Description of the Related Art

In recent years, reduction in size and weight of electronic equipment and communication equipment has rapidly been advanced. This advance has also required reduction in size and weight of batteries used as a driving power source for these equipment. For this request, there has been proposed commercialization of secondary batteries with a nonaqueous electrolyte in which lithium ion secondary batteries having high voltage and high energy density were exemplified as a typical example, in replacement of conventional alkaline batteries.

Regarding an electrode plate which has a great influence on the performance of the secondary batteries with a nonaqueous electrolyte, there has also been proposed reduction in thickness and enlargement in area of the electrode plate, in order to elongate a charge/discharge cycle life and obtain a high energy density. For examples, Japanese Patent Laid-open Publication Nos. 10456/1988 and 285262/1991 disclose positive electrode plates which are produced by the steps of: dispersing or dissolving an active material powder for the positive electrode plate, which is composed of metallic oxides, sulfides, halides or the like, a conductive agent and a binder into a suitable wetting agent (referred to as "solvent" hereinafter) to prepare an active material coating solution in the form of paste; and applying this active material coating solution on a surface of a collector as a substrate made of a metallic foil to form a coating layer (active material layer). In this process, as the binder, for example, there is used fluororesin such as polyvinylidene fluoride or the like or silicone-acrylic copolymer. On the other hand, negative electrode plates has been produced by the steps of: adding such an active material powder for the negative electrode plate as carbon into a solution or dispersion of a binder in a suitable solvent to prepare an active material coating solution in the form of paste; and applying this active material coating solution on a surface of a collector made of a metallic foil.

In the above-mentioned coating type electrode plate, the binder for preparing the active material coating solution requires an electrochemical stability and insolubility against the nonaqueous electrolyte, and solubility in a certain solvent for a coating process. Furthermore, the active material layer (coating layer) of the electrode plate, which is obtained by applying the active material coating solution on the collector of the metallic foil and drying same, requires sufficient flexibility and adhesive property to prevent peeling, chipping, cracking or the like at the assembling process and the charge/discharge process of the battery.

As usual, for the electrode plate, the presence of the coating layer is unfavorable for a certain portion thereof, for example, a portion to which a terminal for introducing an electric current is connected or a portion at which the electrode plate is bent for preparing a battery. For this reason, the electrode plate is usually provided with the active material layer formed in a predetermined pattern and at least one non-coated (or non-coating) portion on which the active material layer is not disposed. However, when a coater of the conventional art is used to form coated portions (i.e., portions provided with the active material layer) and noncoated portions (i.e., boundary portions between the active material layers, portions to which the terminals are to be connected, or the like portions) on the collector surface in a continuous manner at a high speed, it comes necessary that a coater head alternately repeats to be brought into contact with the collector surface and brought apart therefrom.

For example, when a coating speed of the coater goes higher while the collector surface is subjected to the coating process in a continuous manner with a width of the coated portion being set for 60 cm and a width of the noncoated portion being set for 5 cm, a contact time of the coater head to the collector surface is shortened, causing difficulty of a mechanical control of the coater head for applying the coating solution in a certain pattern. Accordingly, it is difficult to form the coated portion and the noncoated portion having accurate patterns respectively in the continuous manner at a high coating speed. On the other hand, a low coating speed prevents the problem of accuracy, but causes a problem of productivity of the electrode plate.

SUMMARY OF THE INVENTION

An object of the present invention is therefore to eliminate substantially defects and problems encountered in the prior art described above. More specifically, a first object of the present invention is to provide a process for producing an electrode plate which is capable of accurately forming an active material layer and a noncoated portion in accordance with a predetermined pattern on a collector surface with high efficiency. And, a second object of the present invention is to provide the electrode plate produced by such an process.

The object of the present invention can be achieved by providing a process for producing an electrode plate for a secondary battery with a nonaqueous electrolyte, comprising the steps of:

applying a peelable material on a predetermined area of a collector surface, and drying the same to form a peelable layer;

applying an electrode forming composition comprising an active material and a binder on the collector surface to form an active material layer lying over at least one area of the peelable layer previously formed; and peeling the peelable layer from a collector together with a portion of the active material layer disposed on the peelable layer to partially expose the collector surface, thereby forming a noncoated portion having a predetermined pattern on the collector surface.

According to the present invention, because the peelable layer having a certain pattern, which is determined in consideration for a layout of the active material layer and the noncoated portion, is previously formed on the collector surface before forming the active material layer, it is possible to form accurately and economically the active material layer having a predetermined pattern on the collector surface.

DESCRIPTION OF THE PREFERRED EMBODIMENTS

The present invention will be described in detail hereunder through preferred examples with reference to the accompanying drawings.

The present invention provides a process for producing an electrode plate which comprises the steps of:

(1) a step in which a peelable material is applied on a predetermined area of a collector surface, and drying same to form a peelable layer;

(2) a step in which an electrode forming composition composed of at least an active material, a binder and dispersion medium is applied on the collector surface so as to overlap with the peelable layer previously formed;

(3) a step in which the dispersion medium is removed from the thus applied electrode forming composition to form an active material layer lying over at least one area of the peelable layer; and, (4) a step in which the peelable layer is peeled from a collector together with a portion of the active material layer disposed on the peelable layer to partially expose the collector surface, thereby forming a noncoated portion having a predetermined pattern on the collector surface.

After the above peeling step, a surface of the remaining active material layer may be flatted as occasion demands.

Figure 1:
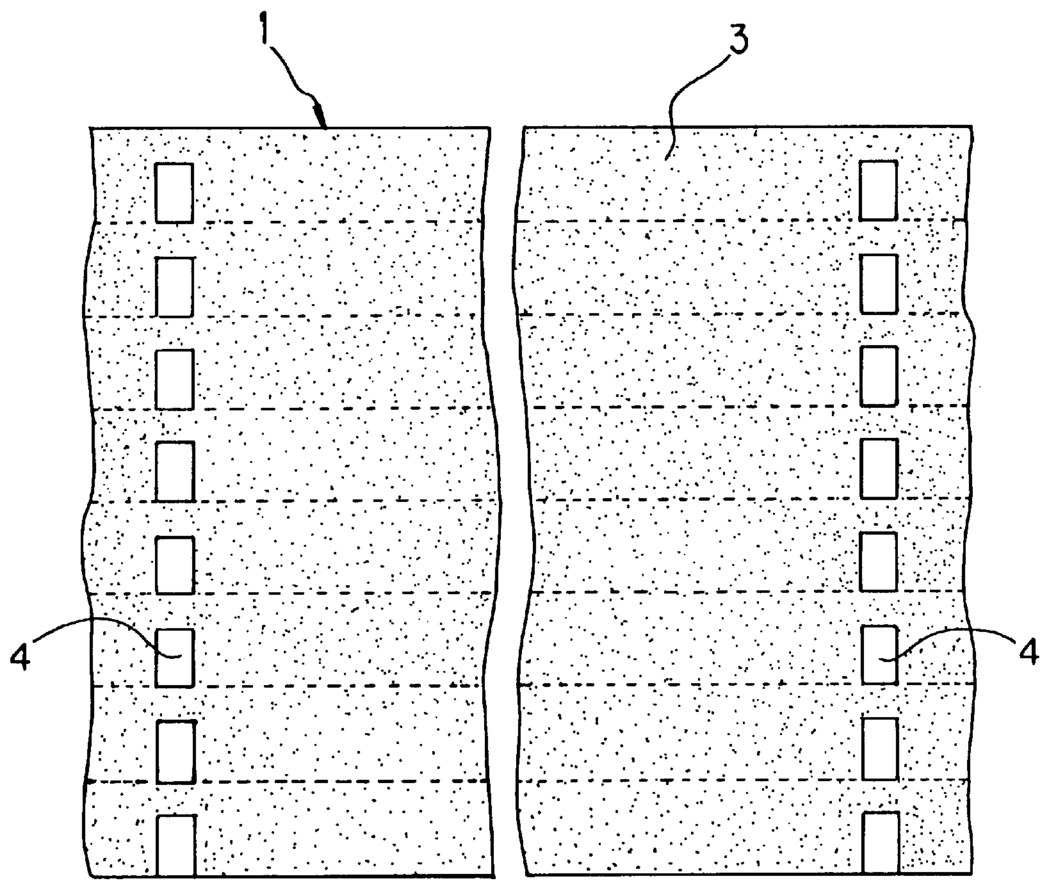
FIG. 1 is a plan view of an electrode plate according to the present invention.
Figure 2:
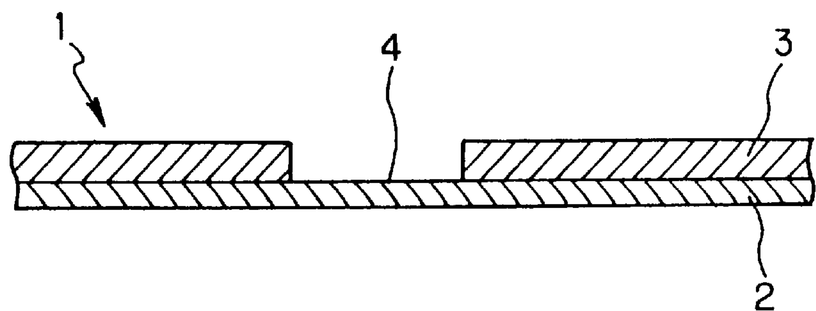
FIG. 2 is a sectional view of the electrode plate of FIG. 1 in an enlarged scale.
Figure 3:
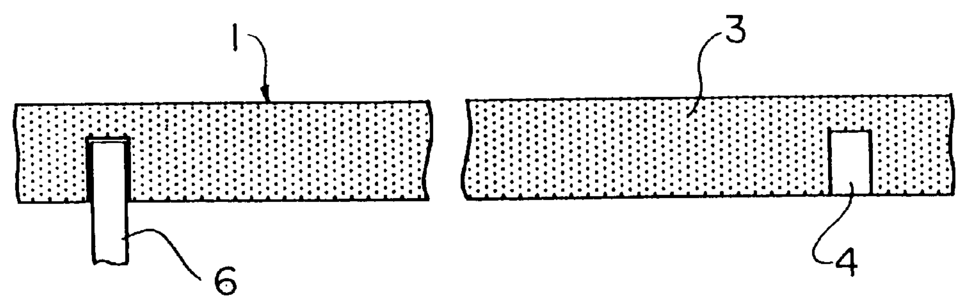
FIG. 3 is a plan view showing a state that the electrode plate of FIG. 1 is partially cut out and a terminal is connected to a noncoated portion.

FIGS. 1 to 3 show an electrode plate 1 which is one example of the electrode plate of the present invention. FIG. 1 is a plan view of the electrode plate 1, and FIG. 2 is an enlarged view showing one part thereof. The electrode plate 1 is provided with an active material layer 3 formed on a collector 2, and a noncoated portion 4 formed by exposing a portion of a collector surface. The noncoated portion 4 has a certain pattern substantially corresponding to an end portion of a terminal to be mounted. The noncoated portion 4 of the electrode plate 1 is used for mounting of the terminal, but noncoated portions in the present invention may be formed for another purpose. FIG. 3 shows a plan view of an electrode plate which is obtained by cutting the electrode plate of FIG. 1 along a dotted line. In FIG. 3, the terminal 6 is mounted on one noncoated portion 4 which is formed by exposing the collector surface in a predetermined pattern.

It is to be noted that the electrode plate of the present invention may take a shape shown in FIG. 1 or a shape shown in FIG. 3. It is also noted that the wording "substantially corresponding" means that the noncoated portion for the terminal mounting portion has the same or substantially the same shape as that of the end portion of the terminal to be mounted and has the same area as or slightly larger or smaller area than that of the terminal end portion so as to ensure an area on which the terminal can be mounted.

Figure 4:
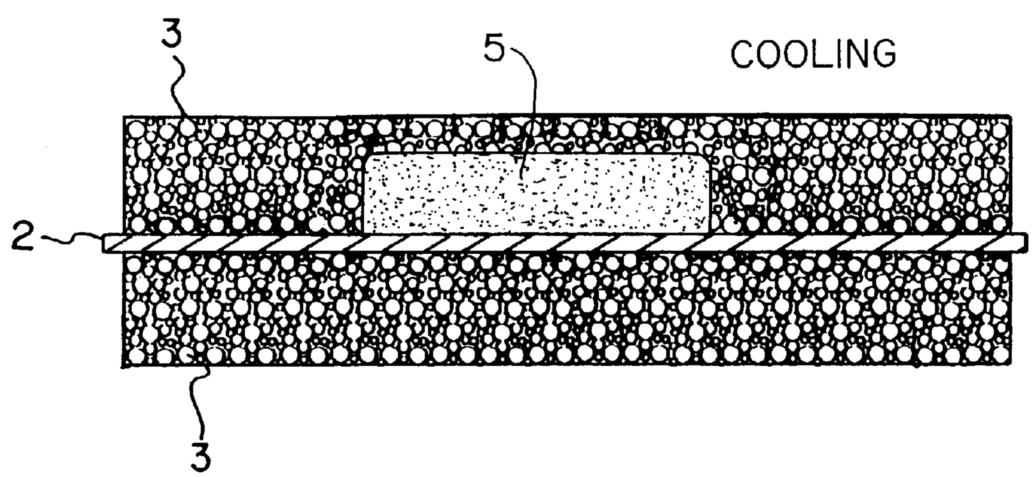
FIG. 4 is a schematic view showing one step in one example of a process for production of the electrode plate of the present invention.
Figure 5:
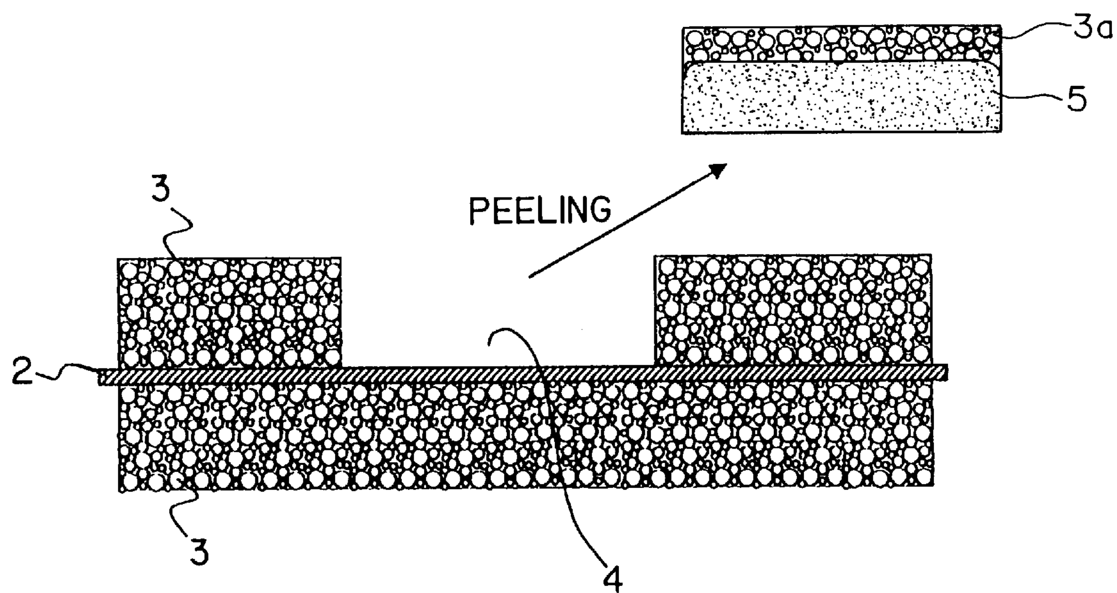
FIG. 5 is a schematic view showing another one step in one example of a process for production of the electrode plate of the present invention.

In the production method of the present invention, the peelable material is applied on the predetermined area of one surface of the collector at first, and then dried same to form the peelable layer. The thus formed peelable layer has a certain pattern which is determined in consideration for a layout of the active material layer and the noncoated portion. Next, as shown in FIG. 4, the electrode forming composition is applied on the collector surface and dried same to form the active material layer 3. Usually, the active material layer is formed on the whole area of the surface side coated with the peelable layer 5, but the active material layer may be formed in a relatively simple pattern as far as the object of the present invention can be achieved. The active material layer 3 is lying over at least one area of the peelable layer 5. Then, as shown in FIG. 5, the peelable layer 5 is peeled from the collector surface together with a portion of the active material layer 3*a* disposed on the peelable layer 5. The peelable layer adheres to the collector surface with a weak bond strength, while the active material layer strongly bonds to the collector surface in an area of which the peelable layer does not interpose. Therefore, the peelable layer can easily be peeled off together with the active material layer disposed thereon, exposing easily the collector surface in a predetermined pattern with a sharp edge.

As a coating method for the peelable material, there is preferably carried out a method capable of applying the peelable material in a certain pattern on the collector when the peelable material is in the molten state. For a coating work with the peelable material in the molten state, there may be used usual coating apparatuses, for example, a gravure coater, a gravure reverse coater, a roll coater, a Mayer bar coater, a blade coater, a knife coater, an air knife coater, a slot die coater, a slide die coater, a dip coater, a nozzle coater, a dispenser, a die head, or the like.

Figure 6:
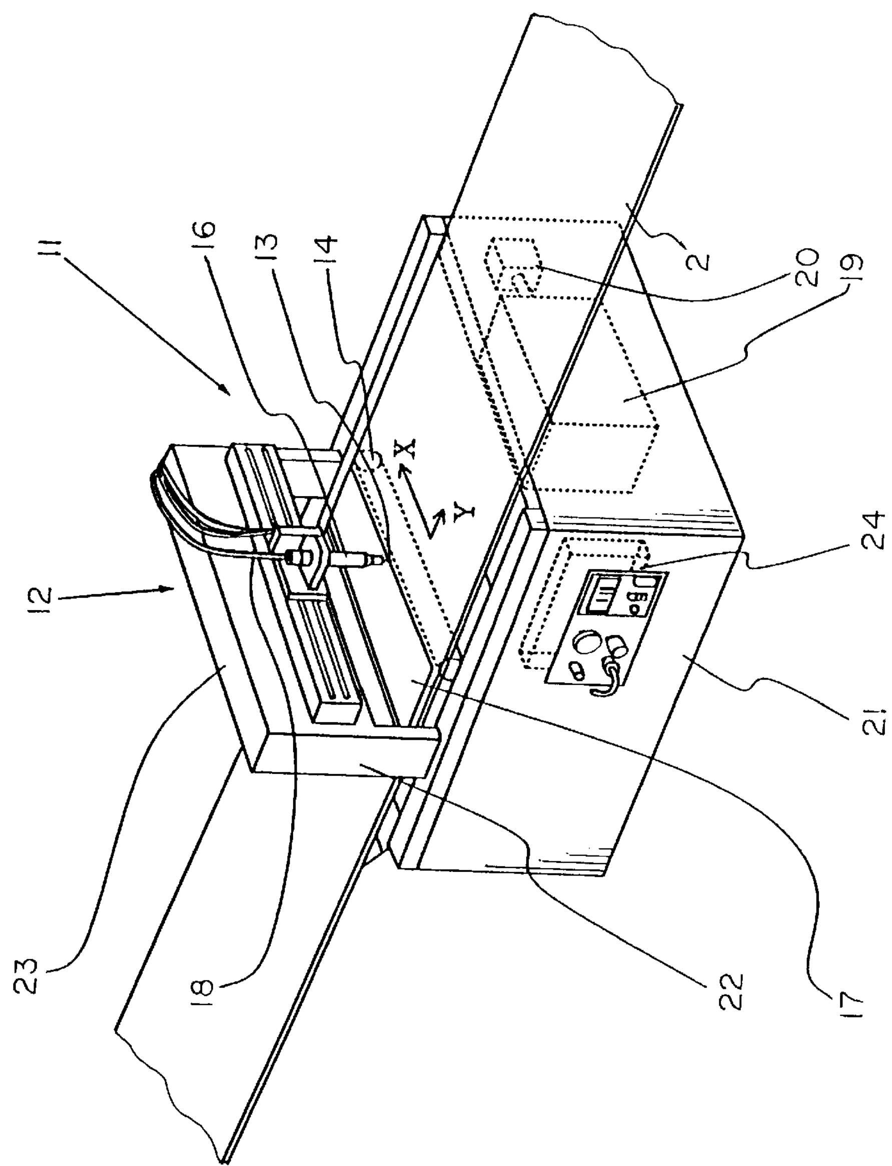
FIG. 6 is a perspective view showing a coating apparatus with a nozzle used in the process for production of the present invention.

For example, if a dropping apparatus for the peelable material as shown in FIG. 6, which is also used for formation of the active material layer, is attached to an X-axis and Y-axis plotter type driving apparatus, it is possible to drop the peelable material based on the prescribed pattern in accordance with the movement of the X-Y axis plotter so as to draw a character, a figure or a pattern. And the peelable material is dropped to draw these prescribed character, figure or pattern. The dropping apparatus will be described more in detail hereafter. It is preferable that the peelable layer in a dried or solidified state has a thickness almost the same as or slightly thinner than that of the active material layer to be formed in the following step.

Thermoplastic resins, in particular, polyethylene, polypropylene, and derivatives of those resins are suitable as the peelable material for formation of the peelable layer, and it is preferable to use a peelable material having a poor adhesion to the metallic foil collector by selecting among the above resins. Polyvinylidene fluoride resins are also suitable. The Polyvinylidene fluoride resins are exemplified by vinylidene fluoride, tetrafluoroethylene and hexafluoropropylene.

Additionally, a peelable material capable of being fluidized by heating is suitable, and a melting point thereof is usually in a range of 100 to 250° C., preferably 120 to 170° C. When the melting point of the peelable material is excessively low, there may be caused difficulty of handling of the peelable material and a decline of the productivity because the peelable material may soften at the room temperature, and furthermore, the peelable layer may be molten in a forming/drying step for the active material layer. On the other hand, the melting point of the peelable material is excessively high, it is uneconomical because of a waste of energy, and furthermore, the collector as a substrate may be deteriorated due to a high operation temperature. A melt viscosity of the peelable material is usually in a range of 100 to 50,000 cps, preferably 400 to 6,000 cps. When the melt viscosity is excessively high, it is uneconomical because of a waste of energy. On the other hand, when the melt viscosity is excessively low, the peelable material in the molten state may be liable to spread excessively on the collector surface, causing difficulty in patterning.

The above mentioned polyethylene, polypropylene and derivatives of those resin may be exemplified by: nonoxidized form having a low density, nonoxidized form having a middle density, nonoxidized form having a high density, oxidized form having a low density, oxidized form having a middle density, oxidized form having a high density, nonpolar type, polar type, fine powder form, or the like.

As a material for the collector of the electrode plate in the present invention, there may be used metallic foil such as aluminum, copper or the like. A thickness of the metallic foil to be used is usually in a range of 5 to 30 $\mu$m.

The active material layer for the positive or negative electrode is formed on the collector surface coated with the peelable layer. In order to improve adhesion between the collector and the active material layer for the positive or negative electrode in an area where the peelable layer does not interpose, a coupling agent layer may be formed on the collector surface. As the coupling agent, there may be used various kinds of coupling agent such as silane series, titanate series, aluminum series, or the like. A coupling agent having an excellent adhesion to both of the metallic foil collector and the active material layer is preferably used by selecting among the above coupling agent.

The silane-coupling agent may be exemplified by γ-(2-aminoethyl) aminopropyl trimethoxy silane, γ-(2-aminoethyl) aminopropyl methyldimethoxy silane, β-(3,4-epoxycyclohexyl) ethyltrimethoxy silane, γ-aminopropyl triethoxy silane, γ-methacryloxypropyl trimethoxy silane, N-β-(N-vinylbenzyl aminoethyl)-γ-aminopropyl trimethoxy silane -hydrochloric acid salt, γ-glycidoxypropyl trimethoxy silane, amino silane, γ-mercaptopropyl trimethoxy silane, amino silane, γ-mercaptpropyl trimethoxy silane, methyl trimethoxy silane, methyl triethoxy silane, vinyltriacetoxy silane, γ-chloropropyl trimethoxy silane, hexamethyldisilazane, γ-anilinopropyl trimethoxy silane, vinyltrimethoxy silane, vinyltriethoxy silane, vinyl tris(β-methoxy ethoxy) silane, octadecyldimethyl [3-(trimethoxysilyl) propyl] ammonium chloride, γ-chloropropyl methyl dimethoxy silane, γ-mercaptopropyl methyl dimethoxy silane, methyltrichloro silane, dimethyldichloro silane and trimethylchloro silane.

The titanate-coupling agent may be exemplified by isopropyltriisostearoyl titanate, isopropyltridodecylbenzenesulfonyl titanate, isopropyl tris(dioctylpyrophosphate) titanate, tetraisopropyl bis(dioctylphosphite) titanate, tetraoctyl bis(ditridecylphosphite) titanate, tetra(2,2-diallyloxymethyl) bis (ditridecyl) phosphite titanate, bis (dioctylpyrophospate) oxyacetate titanate, bis (dioctylpyrophospate) ethylene titanate, isopropyltrioctanoil titanate, isopropyldimathacrylisostearoyl titanate, isopropylisostearoyldiacryl titanate, isopropyl tri(dioctylphosphate) titanate, isopropyltricumylphenyl titanate, isopropyl tri(N-amidoethyl-aminoethyl) titanate, dicumylphenyloxyacetate titanate and diisostearoylethylen titanate.

The aluminum-coupling agent may be exemplified by acetoalkoxyaluminum diisopropylate.

As a method for forming the layer made of the above-mentioned coupling agent on the surface of the collector, there may be applied a method of applying either a coating composition obtained by dissolving the coupling agent into a liquid mixture of water and an organic solvent, or a coating composition obtained by dissolving the coupling agent into an organic solvent, onto the surface of the collector. In this stage, a pH value of the coating composition may be adjusted within a range of from 3 to 5, in order to promote a hydrolysis action of the coupling agent. As a catalyst for hydrolysis of the coupling agent, there may be added for example hydrochloric acid, acetic acid or the like. In order to promote a dehydration action between the coupling agent and the surface of the collector, the applied coupling agent may be heated at a temperature of from 120 to 130° C. As the above-mentioned organic solvent for the coupling agent, there may be used methanol, ethanol, isopropylalcohol, toluene, benzene, acetone, tetrahydrofuran, cellosolve methyl, or the like.

As a method for applying the coupling agent onto the surface of the metallic foil collector, there may be used a conventional coating method such as a gravure coating method, a gravure reverse coating method, a roll coating method, a Mayer bar coating method, a blade coating method, a knife coating method, an air knife coating method, a slot die coating method, a slide die coating method, a dip coating method or the like. The coupling agent layer preferably has a thickness within a range of 0.001 to 5 $\mu$m in a dried condition.

As an active material for the positive electrode used in the present invention, there may be used at least one kind of lithium oxides such as $LiCoO_2$, $LiNiO_2$, $LiMn_2O_4$ or the like, and chalcogen compounds such as $TiS_2$, $MnO_2$, $MoO_3$, $V_2O_5$ or the like. As an active material for the negative electrode, on the other hand, it is preferable to use metallic lithium, lithium alloy and carbonaceous material such as graphite, carbon black, acetylene black or the like, or material capable of intercalating lithium ions. When $LiCoO_2$ is used as the active material for the positive electrode and the carbonaceous material is used as the active material for the negative electrode, it is possible to obtain a lithium secondary battery having a high discharge voltage of about 4 volt.

It is preferable to disperse uniformly these active materials in the coating layer as formed. For this reason, it is preferable to use powder of the active material having a particle size of from 1 to 100 $\mu$m and an average particle size of about 10 $\mu$m.

As a binder used for the coating composition containing the above-mentioned active material in the process of the present invention, there may be used: for example, thermoplastic resin such as polyester resin, polyamide resin, polyacrylic acid ester resin, polycarbonate resin, polyurethane resin, cellulose resin, polyolefin resin, polyvinyl resin, fluororesin, polyimide resin or the like; thermosetting resin such as rubber type resin, acrylic resin, urethane resin or the like; ionizing radiation-setting resin such as acrylate monomer, oligomer or the mixture thereof; or the mixture of these kinds of resin.

Description will be given below of a concrete method for preparing the coating composition for the electrode plate used in the present invention, i.e., the method for preparing the electrode forming composition containing the active material. First, the binder and the powdery active material which are appropriately selected from the above-described materials, are added to a dispersion medium comprising an organic solvent such as toluene, methyl ethyl ketone, N-methylpyrrolidone, the mixture thereof or the like, and a conductive agent is added to the dispersion medium as an occasion demands, to prepare a mixture. The thus prepared mixture is subjected to a mixing and dispersing process with the use of the conventional dispersing apparatus such as a homogenizer, a ball mill, a sand mill, a roll mill or the like.

In the preparation of the above-mentioned coating composition, a total amount of the active material and the binder is preferably within a range of from about 40 to 80 wt. parts relative to 100 wt. parts of the whole coating composition, and the ratio of the active material to the binder is preferably within a range of from 9:1 to 8:2. As a conductive agent added as an occasion demands in the preparation of the coating composition, there may be used for example carbonaceous material such as graphite, carbon black, acetylene black or the like.

As a method for applying the coating composition on the surface of the collector made of a metallic foil, there may be used a conventional coating method such as a gravure coating method, a gravure reverse coating method, a roll coating method, a Mayer bar coating method, a blade coating method, a knife coating method, an air knife coating method, a slot die coating method, a slide die coating method, a dip coating method, a die coating method, a comma coating method, a comma reverse coating method, or the like.

The active material layer may be formed by applying the coating composition with the use of a coating apparatus with nozzle (i.e., nozzle coater). The nozzle coater will be described below with reference to FIG. 6. The nozzle coater 11 comprises an x-axis and y-axis direction driving robot 12 and a nozzle 13. According to the nozzle coater 11, the coating composition is applied onto the surface of the collector 2 to form a coating composition layer 17 by, while discharging the coating composition contained in a liquid container 16 called as a dispenser through the nozzle 13 provided at the lower end thereof, on the collector 2 which is movable in the Y-direction on a support 14 located in parallel with the x-axis and y-axis direction driving robot 12, moving the liquid container 16 in the X-direction along the surface of the collector 2.

The coating composition is supplied from a tank 19 to the liquid container 16 through a flexible pipe 18 under the control of a controller 20. The x-axis and y-axis direction driving robot 12 is secured to a bridge-shaped frame 22 which is fixed to a base 21 including the support so as to stride over the support 14. The robot 12 includes an x-axis driving mechanism 23 which is reciprocatively movable in the X-direction and supports the liquid container 16. The controller 20 for the supply of the coating composition and the movement of the x-axis driving mechanism 23 in the X-direction is controlled by means of a controlling apparatus 24 provided on the base 21. The discharging port at the lower end of the nozzle 13 is arranged in the vicinity of the surface of the collector 2. The distance between the discharge port of the nozzle 13 and the surface of the collector 2 are previously determined so as to be consistent with a target thickness of the coating composition layer 17 to be formed by the application of the coating composition.

The controlling apparatus 24 controls the driving of the x-axis driving mechanism 23 as described below. According to a typical example of a control program, the liquid container 16 having the nozzle 13 is reciprocatively and linearly moved in the X-direction by means of the x-axis driving mechanism 23 under the control of the controlling apparatus 24, and the support 14 is carried in the Y-direction by a prescribed pitch. Here, the above-mentioned pitch is previously determined not so as to become larger than a width of a coating composition applied by the nozzle 13, thus making it possible to prevent a gap from being formed between linear narrow coating layers which are adjacent to each other in the Y-direction, to permit the coating of the entire area.

The pitch in the width direction of the linear coating layers may be determined depending upon parameters such as a diameter of the discharge port of the nozzle 13, a discharging pressure, viscosity of the coating composition and its surface tension.

The controlling apparatus 24 is previously programmed so that, when the collector 2 is carried in the Y-direction by one pitch after the completion of the formation of one linear narrow coating layer by the driving of the nozzle 13 in the X-direction, the application of pressure to the liquid container 16 is ceased to stop the discharge of the coating composition from the nozzle 13.

Then, description will be given the step of applying the coating composition on the collector 2 with the use of the nozzle coater 11.

The coating composition is supplied to the liquid container 16 under the control of the controller 20, and the liquid container 16 having the nozzle 13 is simultaneously moved linearly in the X-direction by means of the x-axis driving mechanism 23, to form the first linear narrow coating composition layer. The pressure applied to the liquid container 16 is kept constant during the formation of the linear narrow coating composition layer. After the completion of the formation of the first linear narrow coating composition layer, the discharge of the coating composition from the nozzle 13 is stopped, and accordingly it is possible to prevent the thickness of the end portion of the linear narrow coating composition layer from becoming larger than that of the other portion thereof.

Then, the collector 2 is carried in the Y-direction by one pitch, and the nozzle 13 is driven in the opposite direction to the forming direction of the first linear narrow coating composition layer by the x-axis driving mechanism 23, to form the second linear narrow coating composition layer.

A plurality of linear narrow coating composition layers are formed by repeating the above-mentioned steps so as to form the coating composition layer 17. The thus formed coating composition layer 17 is dried to form the active material layer on the whole surface of the collector 2. Thus, the coating composition can be applied to the collector 2 by controlling the movement of the nozzle in the X and Y-directions by means of the controlling apparatus 24, and carrying the collector 2.

The discharge port at the lower end of the nozzle 13 of the nozzle coater 11 may have a circular or oval cross-sectional shape, or may have a slit-shape. The nozzle 13 may comprise a multiple-type nozzle having a plurality of small nozzles.

The use of the nozzle in which the discharge port has the oval cross-sectional shape or the slit-shape, permits to increase the width of the linear narrow coating composition layer, thus increasing the coating velocity.

Although the coating apparatus is described to have a single nozzle 13, a plurality of nozzles 13 may be provided at a prescribed interval which is an integral multiple of the pitch in the linear narrow coating composition layers in the Y-direction. In this case, both of the distance between the "N"th nozzle and the "N+1"th nozzle in the Y-direction, and the distance between the "N+2"th nozzle and the "N+1"th nozzle in the Y-direction are previously determined to be identical with an integral multiple of the pitch in the linear narrow coating composition layers in the Y-direction, and the former distance is previously determined to be identical with the latter distance. The respective nozzles may be driven in synchronization with each other or may be driven in non-synchronization with each other.

The use of the plurality of nozzles permits to increase the coating velocity, since the application of the coating composition is carried out by the plurality of nozzles. Although there is described that, in nozzle coater 11, the coating composition is applied on the collector 2 by moving the collector 2 in the Y-direction and moving the liquid container 16 in the X-direction by means of the x-axis driving mechanism 23, the coating apparatus used in the present invention is not limited only to the above-described type of the apparatus, and the application of the coating composition may be carried out by stationarily arranging the collector and moving the liquid container 16 in the X and Y-directions.

Although there is described that, in the nozzle coater 11, the distance between the nozzle 13 and the surface of the collector 2 is previously determined to be identical with the target thickness of the coating composition layer 17, the present invention is not limited only to such an arrangement, and the linear narrow coating composition layers may be formed by dripping the coating composition in the form of threads from the nozzle 13 which is apart from the collector 2 by a relatively long distance. The distance between the nozzle 13 and the collector 2 may previously be determined to be smaller than the target thickness of the coating composition layer 17, and the application of the coating composition may be carried out in such an arrangement.

Then, the drying step is carried out to remove the dispersion medium from the coating composition layer 17 formed as described above in the following manner, to prepare the active material layer.

As a heat source in the drying step, there may be used hot air, infrared radiation, microwave, high-frequency wave, or the combination thereof. The coating composition layer may be dried by heat radiated from the metallic rollers, the metallic sheet, or the like which support the collector 2 in the drying step. The active material layer has a thickness usually in a range of from 10 to 200 μm, and preferably of from 50 to 150 μm in a dried state. The coating amount of the coating composition is previously determined so that the resultant active material layer has a thickness within the above-mentioned range.

In order to improve homogeneousness of the coating layer formed by carrying out the above-described applying and drying steps, there may be added to the drying step, a step of pressing softly a film having a flat surface made of a polyethylene terephthalate, or the like on the surface of the coating layer, and then, peeling the film therefrom to make the surface of the coating layer smooth. In case where the secondary battery is produced with the use of the electrode plate of the present invention, which has been prepared in the above-described manner, it is preferable to apply a heating treatment and a decompression treatment to the electrode plate prior to the assembling step of the secondary battery, in order to remove moisture in the active material layer of the electrode plate.

In the electrode plate produced by the above mentioned method, the peelable layer having a certain pattern is formed on the collector surface, and the active material layer is formed on almost all of the collector surface coated with the peelable layer so as to lie over at least one area of the peelable layer, and furthermore, the peelable layer adheres to the collector surface with a low bond strength, thereby making it possible to peel easily an active material layer lying on the peelable layer together with the peelable layer while remaining an active material layer directly bonding to the collector surface. For example, tension is applied to the collector as a substrate during the peeling step, to lift up the peelable layer so as to remove same together with the active material layer lying thereon. Alternately, the peelable layer and the active material layer lying thereon which adhere to the collector surface with a low bond strength may be blown off with air.

Figure 7:
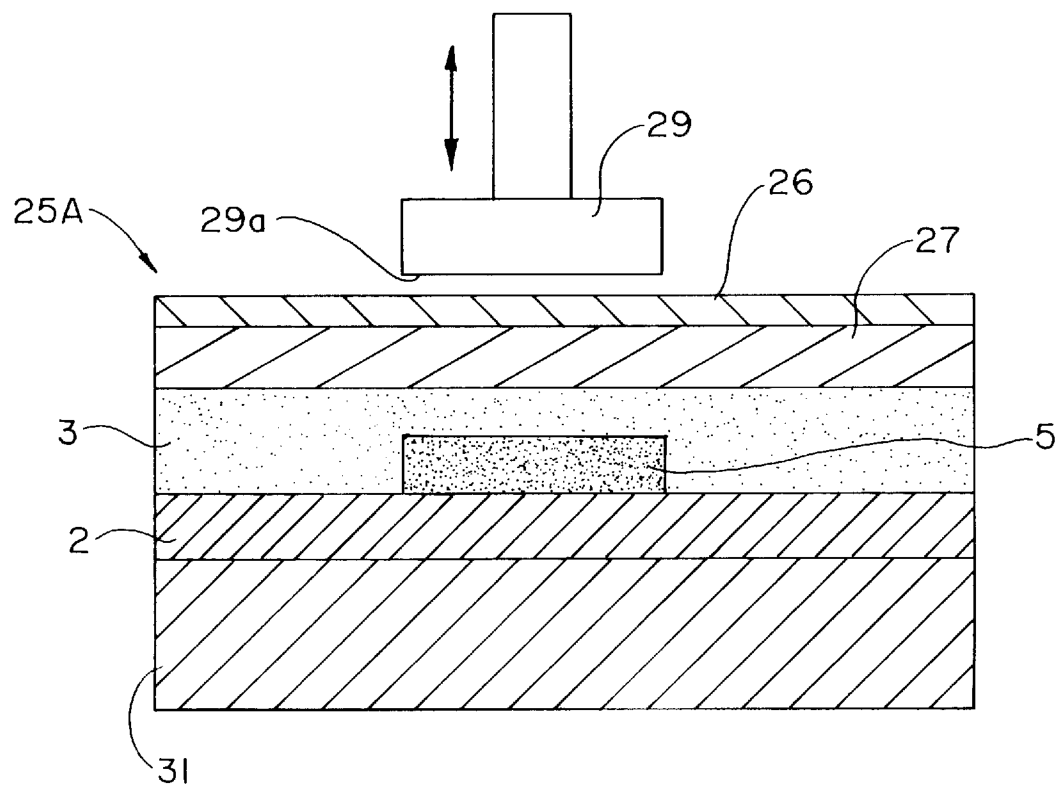
FIG. 7 is a schematic view showing one step in one example of a process for production of the electrode plate of the present invention.
Figure 8:
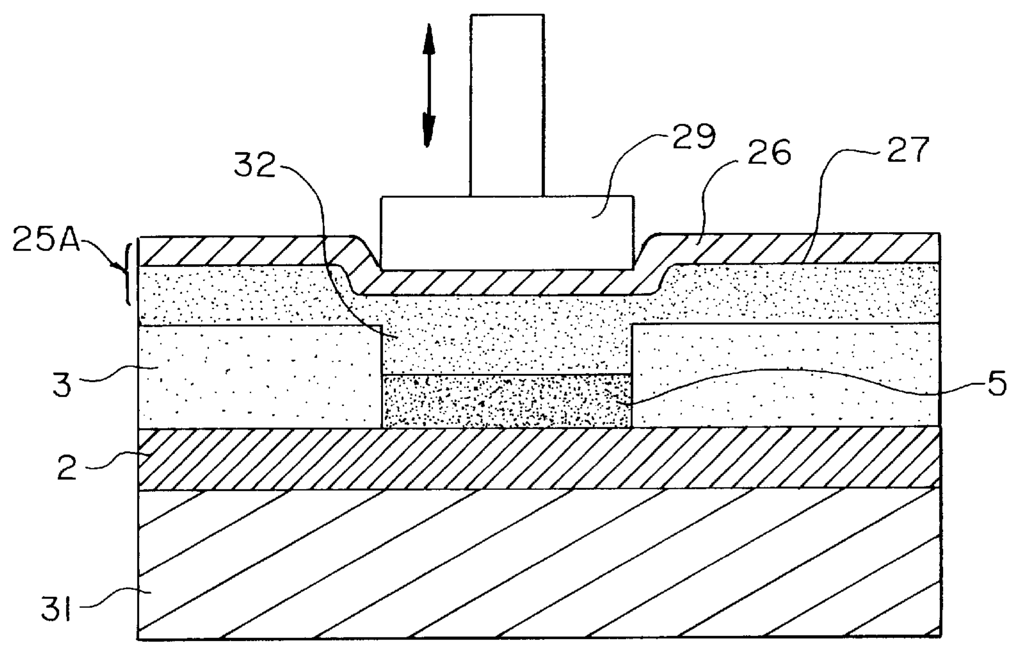
FIG. 8 is a schematic view showing one step in one example of a process for production of the electrode plate of the present invention.
Figure 9:
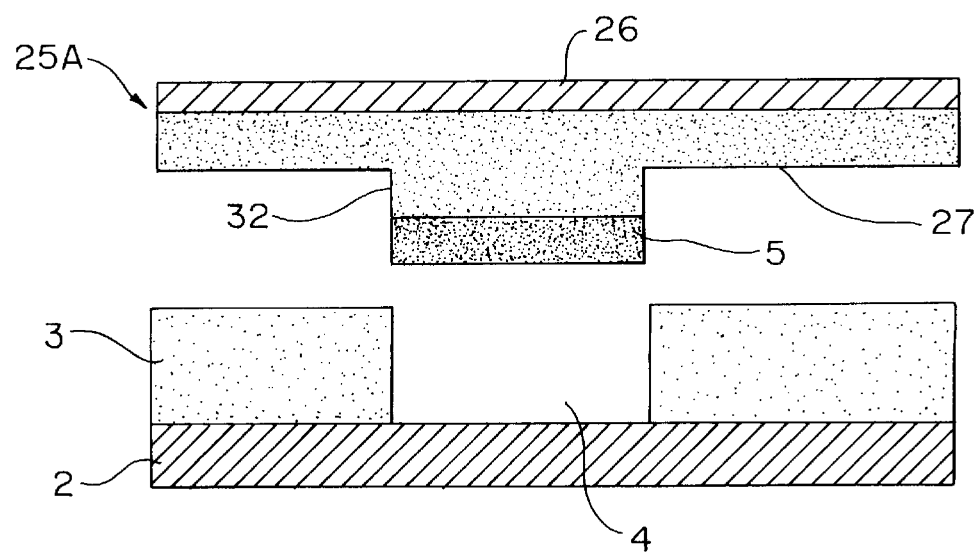
FIG. 9 is a schematic view showing one step in one example of a process for production of the electrode plate of the present invention.

In a preferred embodiment, the peelable layer and the active material layer lying thereon are peeled off with the use of a peeler sheet which comprises a substrate sheet having a heat resistance and a thermoplastic resin layer disposed on the substrate sheet. FIGS. 7 to 9 demonstrates the peeling step in which one of the peeler sheets is used. As shown in FIG. 7, the collector 2 coated with the peelable layer 5 and the active material layer 3 is mounted on a support member 31, and the peeler sheet 25A which is composed of the substrate sheet 26 and the thermoplastic resin layer 27 is laid on the active material layer 3 so as to face the thermoplastic resin layer 27 toward the active material layer 3. Next, as shown in FIG. 8, a heated plate 29, a pressing face **29*a* of which has an almost the same shape as the pattern of the peelable layer 5, is pressed down on a back surface of the peeler sheet 25A while aligning a position of the heated plate 29 with that of the pattern of the peelable layer 5, so that at least one portion of the thermoplastic layer 27 is softened or molten to soak into the active material layer 3. Subsequently, the heated plate is removed and the collector 2 is subjected to a self or forced cooling to solidify the thermoplastic resin in an impregnated portion 32 of the active material layer. Thereafter, the peeler sheet is peeled from the collector. Then, as shown in FIG. 9, the impregnated portion 32 including the peelable layer 5 is peeled off together with peeler sheet 25A to expose a part of the collector surface in accordance with the pattern of the peelable layer, thereby forming the noncoated portion 4** having a predetermined pattern.

Figure 10:
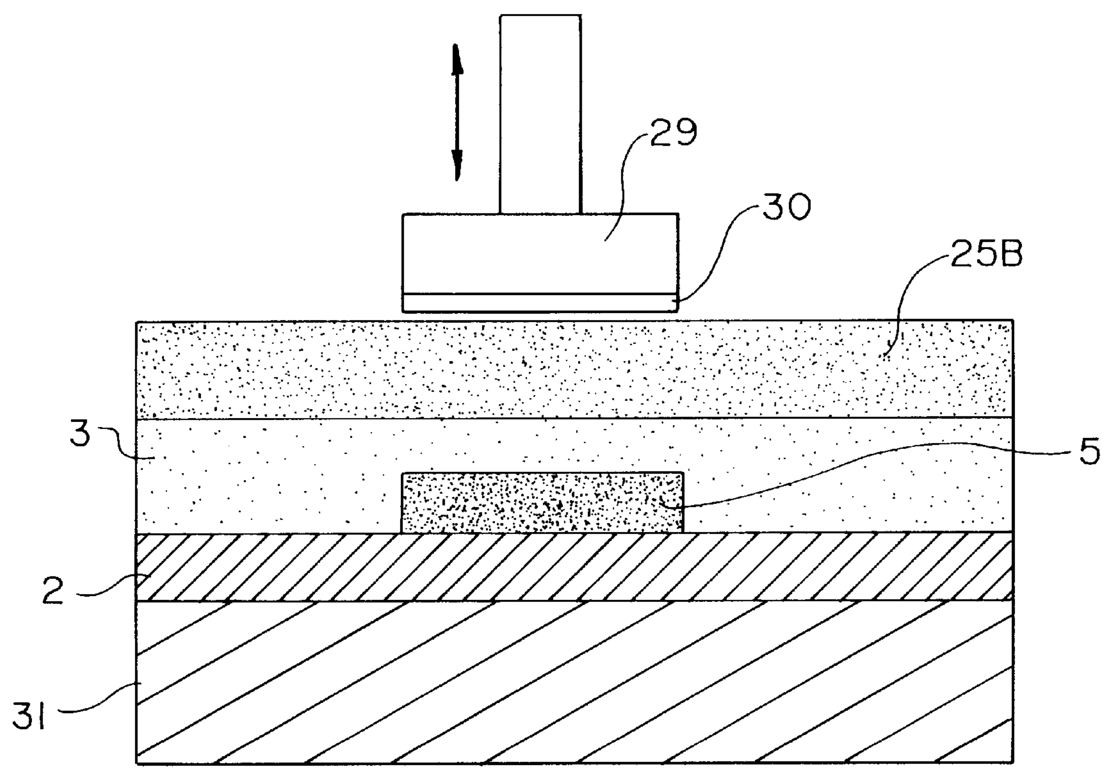
FIG. 10 is a schematic view showing one step in one example of a process for production of the electrode plate of the present invention.
Figure 11:
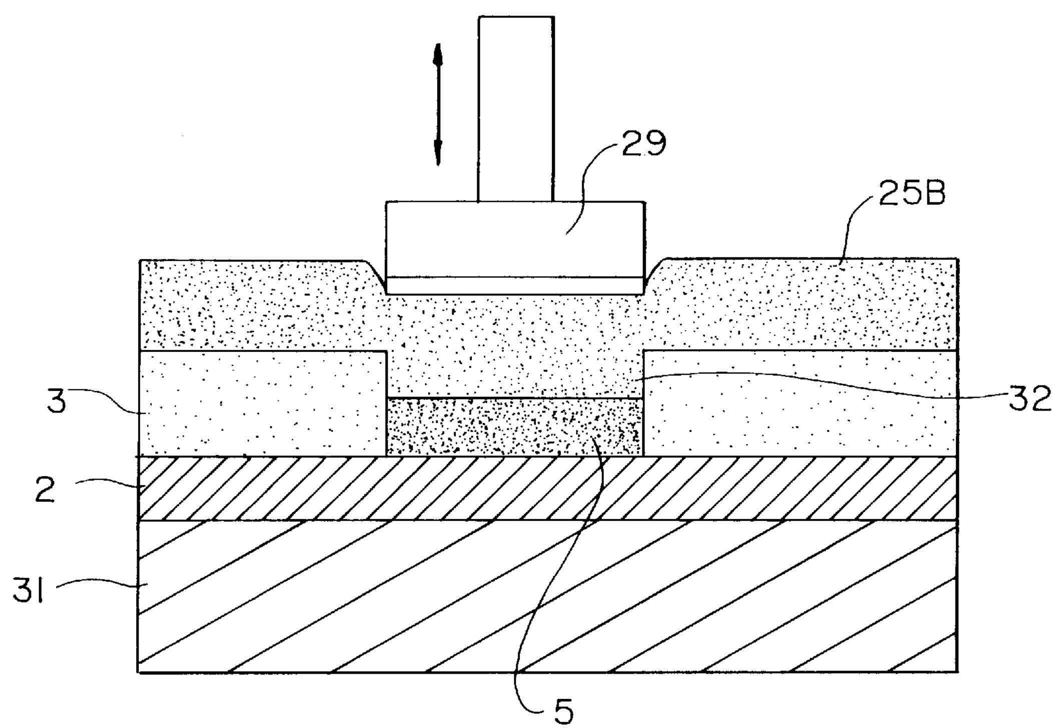
FIG. 11 is a schematic view showing one step in one example of a process for production of the electrode plate of the present invention.
Figure 12:
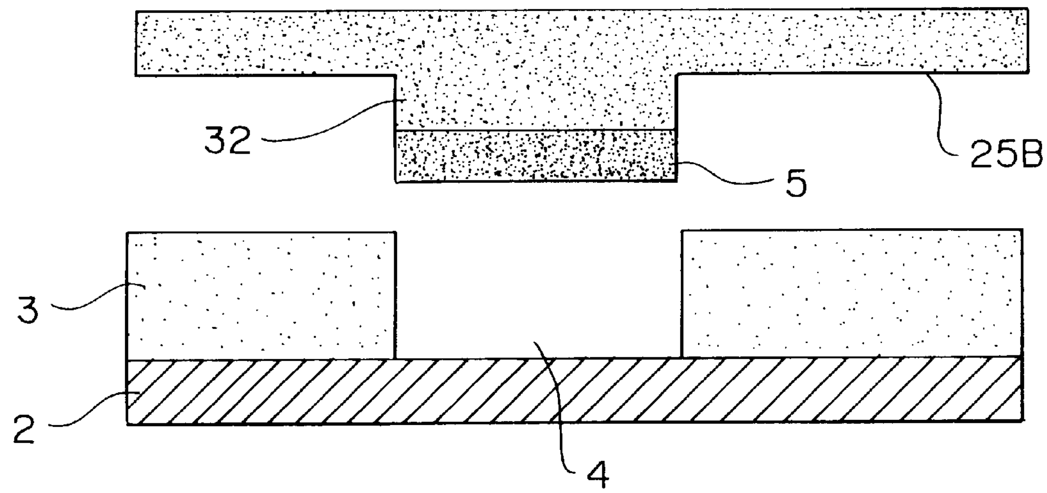
FIG. 12 is a schematic view showing one step in one example of a process for production of the electrode plate of the present invention.

Although the peeler sheet composed of the substrate sheet and the thermoplastic resin layer disposed thereon is used in the above described example, if a thermoplastic resin to be used for the peeler sheet has a relatively high softening point, there may be used, as the peeler sheet, a sheet made of thermoplastic resin which is not provided with the substrate sheet. FIGS. 10 to 12 demonstrate the peeling step in which a peeler sheet 25B having no substrate sheet is used. The peeler sheet 25B having no substrate sheet may be used in the same manner as that of the above described peeler sheet 25A. In this case, it is preferable that a release layer 30 such as a layer of polyethylene fluoride is formed on the pressing surface of the heated plate 29, as shown FIG. 10, in order to prevent a heat fusion between the heated plate 29 and the peeler sheet 25B made of thermoplastic resin.

FIGS. 13 to 16 demonstrate another example, in which a peeler sheet 25C composed of the substrate sheet 26 having a heat resistance, the thermoplastic resin layer 27 disposed on the substrate sheet 26, and a wax layer 28 disposed on the thermoplastic resin layer 27. The peeler sheet 25C having the wax layer may be used in the same manner as that of the above described peeler sheet 25A. When the peeler sheet 25C is used, the wax layer 28 is molten to soak into the active material layer 3 at first stage, and subsequently, a portion of the thermoplastic resin layer 27 is soften or molten to soak into the active material layer 3. Because voids of the active material layer are easily filled with the molten wax, a portion of the active material layer impregnated with the wax is definitely distinguished from a portion not impregnated with the wax. Furthermore, Because the molten wax easily soaks into the active material layer to reach the collector surface, the wax having a good peelability is present in a boundary portion between the collector surface and the active material layer. As a result, pattern wise peeling of the active material layer made further accurate and easy.

The thermoplastic resin for the peeler sheet in the present invention is not limited to a specific one. But, as suitable thermoplastic resins, there may be used a material conventionally used for heat sealing such as polyolefin resins, EVA or the like. Furthermore, it is preferable to use a thermoplastic resin which does not have an excessively large adhesion to the metallic foil such as an aluminum foil, a copper foil or the like. The thermoplastic resin for the peeler sheet preferably has a softening temperature in a range of about 70 to 150° C. As to a melting point, a preferable range is about 100 to 160° C. As to a melt flow rate, i.e., MFR (g/10 minutes, 190–230° C.), a preferable range is about 0.1 to 50.

Polyolefin resins (particularly, polyethylene and polypropylene) are preferably used as the thermoplastic resin for the peeler sheet, because they are used as a separator of the battery and causes no problem even if they contaminate the active material layer.

Figure 13:
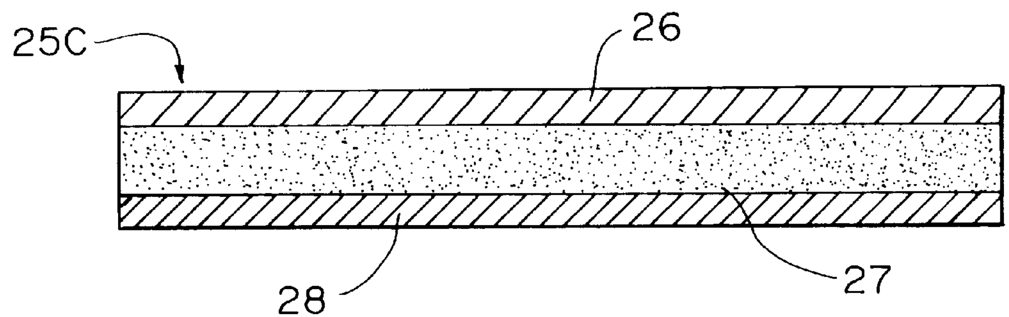
FIG. 13 is a schematic view showing one step in one example of a process for production of the electrode plate of the present invention.
Figure 14:
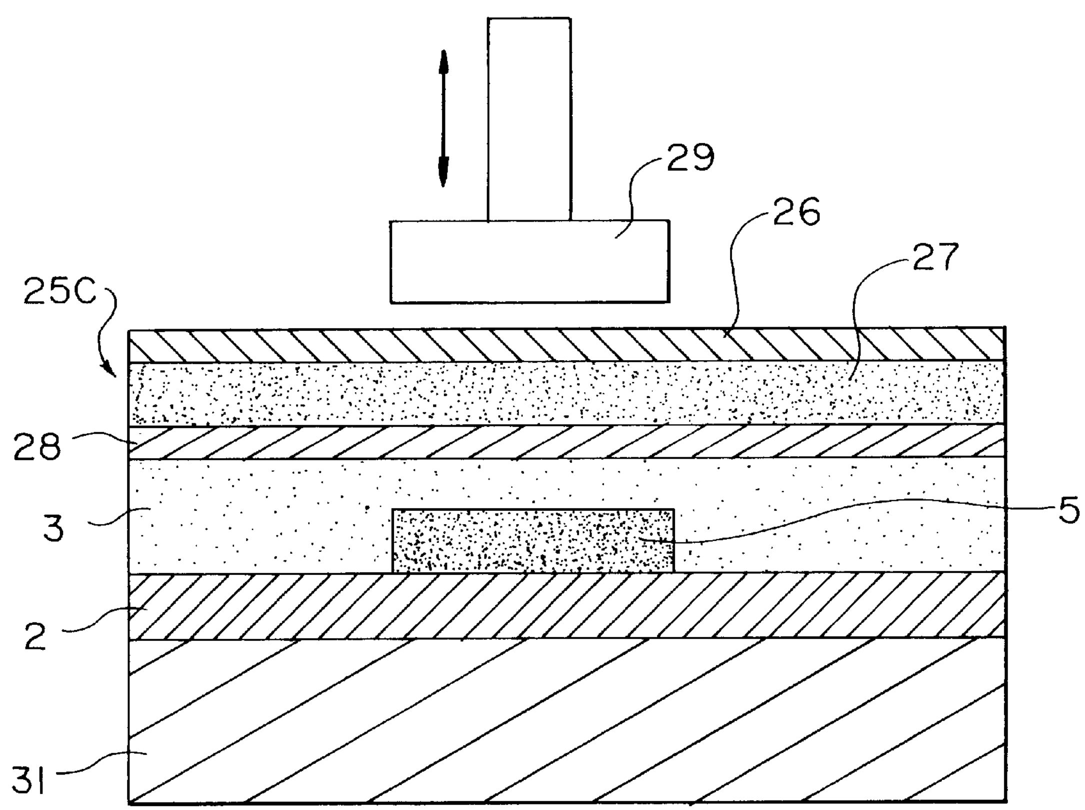
FIG. 14 is a schematic view showing one step in one example of a process for production of the electrode plate of the present invention.
Figure 15:
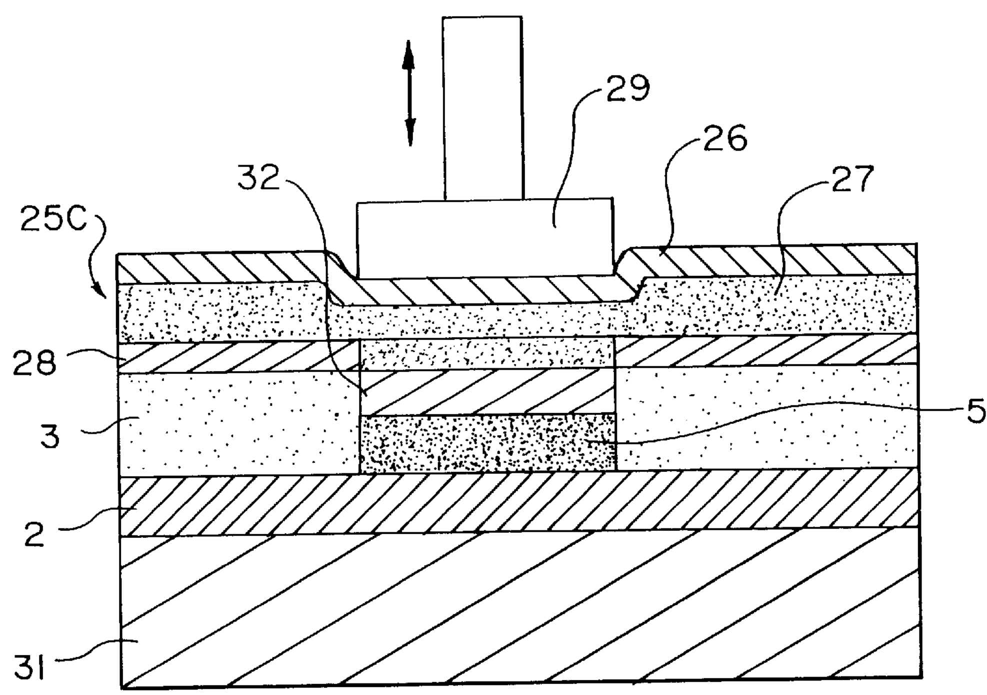
FIG. 15 is a schematic view showing one step in one example of a process for production of the electrode plate of the present invention.
Figure 16:
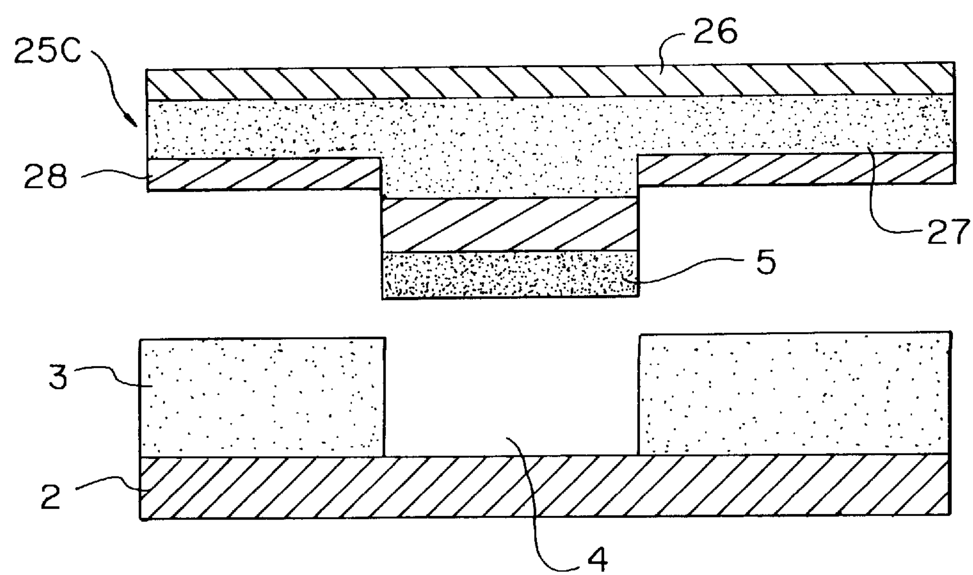
FIG. 16 is a schematic view showing one step in one example of a process for production of the electrode plate of the present invention.

As usual, the above described thermoplastic resin is used as a sheet like form. The sheet of the thermoplastic resin may singly be used as the peeler sheet as shown in FIG. 10. Alternately, the sheet of the thermoplastic resin may be laminated with the substrate sheet having a heat resistance such as polyethyleneterephthalate, nylon or the like as shown in FIG. 7, and further more it may be provided with the wax layer as shown in FIG. 13. A thickness of the thermoplastic resin layer is not limited to a specific range, but it is usually within 50 to 200 $\mu$m.

When the peeler sheet is pressed down, in the heating condition, on an area of the surface of active material layer overlapping with the peelable layer while bringing the surface of the thermoplastic resin layer into contact with the surface of the active material layer, a portion of the thermoplastic resin layer is softened or molten and goes into the voids of the active material layer to solidifies there. As to a condition for the pressing down, a temperature is preferably within 100 to 150° C., and/or a pressure is preferably within 2 to 10 kgf/cm, and/or a term for pressing is preferably within 5 seconds. But, the condition for the pressing down is not limited to the above described range.

A pressing force may be applied from either the collector side or the back surface side of the peeler sheet. The heated plate may be a flat plate, a pressing roller, or the like. When noncoated portions having the same pattern are formed at consistent positions on the front and back surfaces of the collector, the peeler sheets may be disposed on both the surface sides of the collector respectively so as to heat the collector simultaneously from both the surface sides thereof with the use of two heated plates having the same shape. When the pressing down is repeated two or more times, a different kind of the peeler sheets may be used at each time.

After the pressing down in the heating condition, the thermoplastic resin layer of the peeler sheet is bonded to a portion of the active material layer disposed on the peelable layer. Accordingly, when the peeler sheet is peeled from the collector, the peelable layer and a portion of the active material layer disposed thereon are peeled off together with the peeler sheet. Even if the peelable layer or the active material layer to be removed partially remains on the collector surface, such an remaining portion can be completely removed by repeating the pressing down and the peeling of the peeler sheet.

A pattern wise peeling of the active material layer can be achieved by adjusting a pattern of the pressing surface of the heated plate. In one example, if a noncoated portion having a circular pattern is required, the flat plate, the pressing surface of which is previously formed in the circular pattern, is used. In another example, if a heating roller is used as the heated plate, an area of the surface of the active material layer, along which the heating roller was rolled, is made the noncoated portion, thereby forming a solid pattern.

It is preferable that the pressing surface of the heated plate is slightly enlarged in comparison with the area of the peelable layer. The enlarged space preferably has a width of in a range of 0.1 to 2.0 cm, and more preferably in a range of 0.3 to 1.0 cm.

When the peeler sheet is pressing down on the active material layer in the heating condition, the softened or molten thermoplastic resin passes into the voids of the active material layer to go toward the boundary portion between the collector and the active material layer. However, the thermoplastic resin is liable to solidify before reaching such a boundary portion, because the thermoplastic resin has a low flow property in comparison with the wax. If the thermoplastic resin solidifies before reaching the boundary portion between the collector and the active material layer, cohesive failure may be caused in the middle portion of the active material layer during the peeling process of the peeler sheet. As a result, only an upper portion of the active material layer is peeled off, and a lower portion of the active material layer remains on the collector. The remaining portion of the active material layer can be completely peeled off by an additional peeling process, but a workability is lowered.

In general, when the active material layer has a small amount of the voids, it is difficult that the soften or molten thermoplastic resin soaks into the active material layer, thereby causing decrease of a thickness of the active material layer which can be peeled by one peeling process. On the other hand, when the active material layer has a large cohesive strength, it is possible to peel off a large amount of the active material layer together with the peeler sheet, thereby causing increase of a thickness of the active material layer which can be peeled by one peeling process. In a case when the active material layer on the collector is subjected to a pressing process, the cohesive strength of the active material layer is increased while decreasing an amount of the voids thereof, resulting in almost no change in the workability. Furthermore, when the active material layer on the collector is excessively subjected to a pressing process, improvement of the cohesive strength may stop at a certain extent while advancing the difficulty of soaking of the thermoplastic resin, thereby causing a decline of the workability.

The workability of the peeling process can be improved by making the molten wax having a low melt viscosity soak into a portion of the active material layer to be peeled, before soaking of the softened or molten thermoplastic resin. The wax seems to impart the cohesive strength to the active material layer by soaking into the void of the pressed active material layer and solidifying therein.

As method for impregnating the active material layer with the wax, there may be applied various kinds of method, for example: a gravure coating method with the use of the molten wax, a coating method by means of a die coater, a coating method by means of a rotary screen coater, a method in which the wax made in a film like form is thermally pressed down on the active material layer to impregnate the wax thereinto, a method in which a matrix sheet (ex., a non woven fabric, paper or the like) impregnated with the wax is thermally pressed down on the active material layer to transfer the wax thereto, a method in which the peeler sheet provided with the wax layer is used as shown in FIG. 13.

As the wax for impregnating into the active material layer before impregnating of the thermoplastic resin, there may be used a wax capable of being easily molten by heating. The wax is exemplified by polyethylene waxes having a low molecular weight, polypropylene waxes having a low molecular weight, derivatives of those waxes, various kind of natural waxes or the like. More specifically, the above mentioned polyethylene waxes, polypropylene waxes and derivatives thereof include the following waxes: nonoxidized form having a low density, nonoxidized form having a middle density, nonoxidized form having a high density, oxidized form having a low density, oxidized form having a middle density, oxidized form having a high density, nonpolar type, polar type, fine powder form, or the like.

It is preferable to use a wax having a small adhesion to the metallic foil collector and a small extent of volume change at a time of solidification in order to form accurately the pattern of the noncoated portion.

The above described wax has a melting point in a range of about 20 to 250° C. in usual, and preferably in the range of about 60 to 150° C. When the melting point is excessively low, the wax softens at the room temperature, thereby causing a difficulty of handling and a decline of workability. On the other hand, when the melting point is excessively high, the process is uneconomical in view of energy, and the collector as the substrate may be destroyed in a course of the impregnation. The wax has a melt viscosity in a range of about 100 to 50,000 cps in usual, and preferably in a range of about 400 to 6,000 cps. When the melt viscosity is excessively high, the process is uneconomical in view of energy. On the other hand, when the melt viscosity is excessively low, the molten wax is liable to spread excessively in a wide way in a course of the impregnation, thereby causing a difficulty of an accurate patterning.

In case where the lithium secondary battery with a nonaqueous electrolyte is produced with the use of the thus prepared positive and negative electrode plates of the present invention, there is used, as an electrolyte, a nonaqueous electrolyte which is obtained by dissolving lithium salts as solute into an organic solvent.

As lithium salts as solute for forming the nonaqueous electrolyte, there may be used: inorganic lithium salt such as $LiClO_4$, $LiBF_4$, $LiPF_6$, $LiAsF_6$, LiCl, LiBr or the like; or organic lithium salt such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, $LiOSO_2C_7F_{15}$, or the like.

In this stage, there may be used, as an organic solvent, cyclic esters, chain esters, cyclic ethers, chain ethers or the like.

The cyclic esters may be exemplified by propylene carbonate, butylene carbonate, γ-buthyrolactone, vinylene carbonate, 2-methyl-γ-buthyrolactone, acetyl-γ-buthyrolactone and γ-valerolactone.

The chain esters may be exemplified by dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ester, malonic acid dialkyl ester and acetic acid alkyl ester.

The cyclic ethers may be exemplified by tetrahydrofuran, alkyltetrahydrofuran, dialkyltetrahydrofuran, alkoxytetrahydrofuran, dialkoxytetrahydrofuran, 1,3-dioxolan, alkyl-1,3-dioxolan and 1,4-dioxolan.

The chain ethers may be exemplified by 1,2-dimethoxyethane, 1,2-diethoxyethane, diethyl ether, ethylene glycol dialkylether, diethylene glycol dialkylether, triethylene glycol dialkylether and tetraethylene glycol dialkylether.

As mentioned above, according to the present invention, because the peelable layer having a certain pattern determined in consideration for the layout of the active material layer and the noncoated portion is formed on the collector surface prior to applying the electrode forming composition, it is possible to form economically and accurately the active material layer and the noncoated portion in accordance with a predetermined pattern on the collector surface.

The present invention will be described hereunder more in detail with reference to Experimental Examples and Comparative Examples.

EXAMPLES

[Example 1]

First, a peelable layer was formed on a collector surface. Onto a surface of a collector made of aluminum foil having a thickness of 20 μm, a width of 320 mm and a length of 600 mm, a polypropylene (VISCOL 550-P, manufactured by Sanyo Kasei Kogyo Co. Ltd.) molten by heating at 170° C. was applied in a belt like pattern having a width of 10 mm and a length of 200 mm by means of a nozzle coater in which the nozzle had a internal diameter of 0.92 mm and a pressure was adjusted to 0.2 kgf/cm$^2$, and then solidified same. The thus formed peelable layer had a thickness of 120 $\mu$m in a solidified state. A pitch for conveying the collector was 5 mm/min, and a moving speed of the nozzle was 20 mm/sec. A lower end of the nozzle did not have a needle like shape which was generally used, but had a widthwise enlarged opening so as to set a width to be coated by a single motion for 10 mm.

Next, an electrode forming composition for a positive electrode was prepared. The following materials were used for preparing of the positive electrode forming composition: 90 weight parts of $LiCoO_2$ powder having a particle size of from 1 to 100 $\mu$m and an average particle size of 10 $\mu$m, 5.0 weight parts of a graphite powder as a conductive agent, 4 weight parts of a polyvinylidene fluoride resin as a binder (having the product name of "NEOFLON VDF" manufactured by Daikin Industries, Co. Ltd.), and 20 weight parts of N-methyl-2-pyrrolidone. In these materials, the polyvinylidene fluoride was previously dissolved in N-methyl-2-pyrrolidone to prepare a vanish, to which the other powdery materials were added. These powdery materials and the varnish were stirred and mixed by means of a planetary mixer (manufactured by Kodaira Seishakusho Co. Ltd.) for 30 minutes to prepare the positive electrode forming composition in the form of slurry. The thus prepared positive electrode forming composition had a viscosity of 39,000 cps.

Onto the collector surface which was already coated with the polypropylene in the belt like pattern, the above mentioned positive electrode forming composition was applied so as to cover an area having a width of 300 mm and a length of 500 mm by means of a nozzle coater in which the nozzle had a internal diameter of 0.92 mm and a pressure was adjusted to 0.2 kgf/cm$^2$. A pitch for conveying the collector was 6 mm/min, and a moving speed of the nozzle was 30 mm/sec. A lower end of the nozzle did not have a needle like shape which was generally used, but had a widthwise enlarged opening so as to set a width to be coated by a single motion for 30 mm.

Then the coating layer of the positive electrode forming composition was dried at 80° C. to remove the solvent therefrom. In the course of this drying, a polyethylene terephthalate film was laid on a surface of the coating layer and pressed down thereto, and thereafter that film was peeled off to make the surface of the coating layer smooth and homogenous. Subsequently to the above mentioned drying, a further drying was carried out at 120° C. for 2 minutes in an oven to form an active material layer. The coating layer had a thickness of 130 $\mu$m after the drying.

Thereafter, tension was applied to the collector coated with the coating layer. As a result, the coating layer in an area where the peelable layer made of polypropylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 2]

First, a peelable layer was formed on a collector surface. Onto a surface of a collector made of copper foil having a thickness of 14 $\mu$m, a width of 320 mm and a length of 600 mm, a polypropylene (VISCOL 550-P, manufactured by Sanyo Kasei Kogyo Co. Ltd.) molten by heating at 170° C. was applied in a belt like pattern having a width of 10 mm and a length of 200 mm in the same manner as that of Example 1, and then solidified same. The thus formed peelable layer had a thickness of 90 $\mu$m in a solidified state.

Next, an electrode forming composition for a negative electrode was prepared. The following materials were used for preparation of the negative electrode forming composition: 85 weight parts of graphite powder, 15 weight parts of polyvinylidene fluoride (having the product name of "NEOFLON VDF" manufactured by Daikin Industries, Co. Ltd.) and 225 weight parts of N-methyl-2-pyrrolidone as a dispersion medium. The graphite powder and the polyvinylidene fluoride were added into the N-methyl-2-pyrrolidone, and dispersed with the use of a dispersing machine at 8,000 r.p.m. to prepare the negative electrode forming composition. The thus prepared negative electrode forming composition had a viscosity of 32,500 cps.

On a surface of the copper collector which was already coated with the polypropylene in the belt like pattern, application of the above mentioned negative electrode forming composition, removal of the solvent, pressing down of the polyethylene terephthalate film and drying were carried out in the same manner as that of Example 1.

Thereafter, tension was applied to the collector coated with the coating layer. As a result, the coating layer in an area where the peelable layer made of polypropylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 3]

Collectors each of which was coated with a coating layer of an electrode forming composition for a positive or a negative electrode were prepared in the same manner as that of Example 1 or Example 2, except that polyethylene (Polyethylene A-C392, manufactured by Allied Signal Co. Ltd.) was used as the peelable material.

Thereafter, tension was applied to each of the collectors coated with the coating layer. As a result, the coating layer in an area where the peelable layer made of polyethylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 4]

Collectors each of which was coated with a coating layer of an electrode forming composition for a positive or a negative electrode were prepared in the same manner as that of Example 1 or Example 2, except that polyethylene (SANWAX LEL-250, manufactured by Sanyo Kasei Kogyo Co. Ltd.) was used as the peelable material.

Thereafter, tension was applied to each of the collectors coated with the coating layer. As a result, the coating layer in an area where the peelable layer made of polyethylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 5]

Collectors each of which was coated with a coating layer of an electrode forming composition for a positive or a negative electrode were prepared in the same manner as that of Example 1 or Example 2, except that polyethylene (HOECHIST-WAX PE 190, manufactured by Hoechist Industry Co. Ltd.) was used as the peelable material.

Thereafter, tension was applied to each of the collectors coated with the coating layer. As a result, the coating layer in an area where the peelable layer made of polyethylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 6]

Collectors each of which was coated with a coating layer of an electrode forming composition for a positive or a negative electrode were prepared in the same manner as that of Example 1 or Example 2, except that polyethylene (HOECHIST-WAX PE 191, manufactured by Hoechist Industry Co. Ltd.) was used as the peelable material.

Thereafter, tension was applied to each of the collectors coated with the coating layer. As a result, the coating layer in an area where the peelable layer made of polyethylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 7]

Collectors each of which was coated with a coating layer of an electrode forming composition for a positive or a negative electrode were prepared in the same manner as that of Example 1 or Example 2, except that polyethylene (LUWAX OA3 Powder, manufactured by BASF JAPAN Co. Ltd.) was used as the peelable material.

Thereafter, tension was applied to each of the collectors coated with the coating layer. As a result, the coating layer in an area where the peelable layer made of polyethylene was formed in the belt like pattern was spontaneously lifted up together with the peelable layer, and easily peeled from the collector to expose the collector surface in a predetermined pattern. The thus formed noncoated portion had a sharp edge and production of powdery flakes of the coating layer did not observed.

[Example 8]

First, a peelable layer was formed on both of surfaces of a collector made of an aluminum foil. The collector was formed in a lengthwise continued form and had a thickness of 20 μm and a width of 650 mm. Onto one surface of the collector, a solution of polyvinylidene fluoride dissolved in N-methyl-2-pyrrolidone (6% of a solid component) was applied through a gravure direct method by means of a gravure coater. A gravure plate was 120 lines/inch. An applied amount was 4 g/m$^2$. Each of coated portions was formed in a rectangular pattern having a width of 40 mm and a length of 600 mm, and arranged in a lengthwise direction of the collector by a certain interval. Furthermore, onto another surface of the collector, the peelable layer was formed in the same manner so as to be in consistent with the pattern and the position of the each peelable layer formed on the opposite surface.

Next, an electrode forming composition for a positive electrode was prepared. The following materials were used for preparing of the positive electrode forming composition: 90 weight parts of $LiCoO_2$ powder having a particle size of from 1 to 100 μm and an average particle size of 20 μm, 5.0 weight parts of graphite powder as a conductive agent, 33 weight parts of a solution of polyvinylidene fluoride resin as a binder (K#1100 manufactured by Kureha Kagaku Kogyo Co. Ltd.) dissolved in N-methyl-2-pyrrolidone (12% of a solid component), and 5 weight parts of N-methyl-2-pyrrolidone. These materials are mixed with each other by means of a planetary mixer (manufactured by Kodaira Seishakusho Co. Ltd.) for 30 minutes to prepare the positive electrode forming composition in the form of slurry.

Onto the collector surfaces which were already coated with the polyvinylidene fluoride resin in the rectangular pattern, the above mentioned positive electrode forming composition was applied so as to cover the whole surface of the collector by means of a slot die coater.

Then the coating layer of the positive electrode forming composition was dried by passing it through an oven (100° C.–120° C.–130° C.–140° C.) having a length of 8 m, at a conveying speed of 4 m/minutes. The opposite surface side of the collector was also dried in the same manner. An applied amount in a dried state was 180 g/m$^2$. Subsequently to the above mentioned drying, a further drying was carried out at 80° C. for 48 hours in an oven to remove a moisture from the coating layer, thereby forming an active material layer for the positive electrode.

Furthermore, a peelable layer was formed on both of surfaces of a collector made of a copper foil in the same manner as that of the aluminum foil. The copper foil collector was formed in a lengthwise continued form and had a thickness of 15 μm and a width of 620 mm.

Next, an electrode forming composition for a negative electrode was prepared. The following materials were used for preparation of the negative electrode forming composition: 85 weight parts of graphite powder, 125 weight parts of a solution of polyvinylidene fluoride resin as a binder (KF#1100 manufactured by Kureha Kagaku Kogyo Co. Ltd.) dissolved in N-methyl-2-pyrrolidone (12% of a solid component), and 5 weight parts of N-methyl-2-pyrrolidone as a dispersion medium. These materials are mixed with each other in the same manner as that of the positive electrode forming composition to prepare the negative electrode forming composition.

Onto the surfaces of the copper collector which were already coated with the polyvinylidene fluoride resin in the rectangular pattern, the above mentioned negative electrode forming composition was applied so as to cover the whole surface of the collector by means of a die coater.

Then the coating layer of the negative electrode forming composition was dried by passing it through an oven (100° C.–120° C.–130° C.–140° C.) having a length of 8 m, at a conveying speed of 2 m/minutes. The opposite surface side of the collector was also dried in the same manner. An applied amount in a dried state was 100 g/m$^2$. Subsequently to the above mentioned drying, a further drying was carried out at 80° C. for 48 hours in an oven to remove a moisture from the coating layer, thereby forming an active material layer for the negative electrode.

Thereafter, the coating layers of the positive and the negative electrode forming composition were peeled off with the use of a peeler sheet which was composed of a PET film having a thickness of 25 μm as a substrate sheet and a polyethylene layer having a thickness of 100 μm as a thermoplastic resin layer, while pressing down by means of a plate heated at 135° C. for 3 to 5 seconds.

As a result, the peelable layer and a portion of the coating layer disposed on the peelable layer were easily peeled off together with the peeler sheet. The thus formed noncoated portion had a sharp edge and production of powdery flakes of the coating layer did not observed.

[Example 9]

A positive electrode and a negative electrode were produced in the same manner as that of Example 8, except that the peeling process was carried out after the coating layer was pressed three times at the room temperature by means of a pressure roller with 1 (one) ton of an applied load. After applying the pressure load, the positive electrode had a thickness of 180 μm in a total thickness of the aluminum collector, the active material layer on the front surface of the collector and the active material layer on the back surface of the collector. On the other hand, the negative electrode had a thickness of 160 μm in a total thickness of the copper collector and the two active material layers on both the surfaces the collector.

As a result, the peelable layer and a portion of the coating layer disposed on the peelable layer were easily peeled off together with the peeler sheet, even after the pressing process.

[Example 10]

A positive electrode and a negative electrode were produced in the same manner as that of Example 8, except that fluoro rubber (BAYTON AHV, manufactured by Du Pont Co., Ltd.) was used as a peelable material in place of the polyvinylidene fluoride, and methyl ethyl ketone was used as a solvent for the peelable material in place of the N-methyl-2-pyrrolidone.

As a result, the peelable layer and a portion of the coating layer disposed on the peelable layer were easily peeled off together with the peeler sheet. The thus formed noncoated portion had a sharp edge and production of powdery flakes of the coating layer did not observed.

[Example 11]

A positive electrode and a negative electrode were produced in the same manner as that of Example 8, except that polyethylene was used as the peelable material in place of the solution of the polyvinylidene fluoride, and the polyethylene was applied by an extrusion method with a molten temperature of 200° C., and cooled immediately after that application.

As a result, the peelable layer and a portion of the coating layer disposed on the peelable layer were easily peeled off together with the peeler sheet. The thus formed noncoated portion had a sharp edge and production of powdery flakes of the coating layer did not observed.

[Example 12]

A positive electrode and a negative electrode were produced in the same manner as that of Example 8, except that the each pattern of the peelable layers is changed to the rectangular pattern which was arranged on one edge side of the collector surface in a certain interval.

As a result, the peelable layer and a portion of the coating layer disposed on the peelable layer were easily peeled off together with the peeler sheet. The thus formed noncoated portion had a sharp edge and production of powdery flakes of the coating layer did not observed.

[Example 13]

A positive electrode and a negative electrode were produced in the same manner as that of Example 8, except that the peelable layer was formed in a two belt like patterns each of which had a width of 40 mm and extended in a lengthwise direction of the collector in parallel with each other.

As a result, the peelable layer and a portion of the coating layer disposed on the peelable layer were easily peeled off together with the peeler sheet. The thus formed noncoated portion had a sharp edge and production of powdery flakes of the coating layer did not observed.

[Comparative Example 1]

Onto a surface of the aluminum foil collector which was formed in a lengthwise continued form and had a thickness of 20 μm and a width of 300 mm, the same electrode forming composition for the positive electrode as that used in Example 8 was applied by means of a slot die coater. The coating layer was formed in a predetermined pattern so as to arrange noncoated portions with a certain interval by controlling an amount of the electrode forming composition to be supplied from the slot die. More specifically, the noncoated portions were formed by decreasing an amount of the electrode forming composition to be supplied from the slot die. As a result, increase of a coating speed accelerated distortion of the pattern of the coating layer, thereby causing difficulty of a constant coating.

[Comparative Example 2]

A positive electrode and a negative electrode were produced in the same manner as that of Example 8, except that the peelable layer was not formed, and that a noncoated portions were formed with the use of an adhesive tape having a width of 10 mm and a length of 200 mm. The adhesive tape was stack onto the surface of the coating layer, and peeled off to form the noncoated portion. As a result, much of portions to be removed of the coating layer were left non-peeled on the collector, and the non-coated portion did not have a sharp edge and in which there was observed the production of powdery flakes of the coating layer.

[Comparative Example 3]

A positive electrode and a negative electrode were prepared as in the same manner as the Example 8. The coating layer of each of the electrode plates for the positive and negative electrodes was scraped off by means of a spatula to prepare a non-coated portion having a width of 10 mm and a length of 200 mm. As a result, much of portions to be removed of the coating layer were left non-peeled on the collector, and the non-coated portion did not have a sharp edge and in which there was observed the production of powdery flakes of the coating layer.

What is claimed is:

1. A process for producing an electrode plate for a secondary battery with a nonaqueous electrolyte, comprising the steps of:

applying a peelable material on a predetermined area at a collector surface, and drying same to form a peelable layer;

applying an electrode forming composition comprising an active material and a binder on the collector surface to form an active material layer lying over at least one area of the peelable layer previously formed; and peeling the peelable layer from a collector together with a portion of the active material layer disposed on the peelable layer to partially expose the collector surface, thereby forming a noncoated portion having a predetermined pattern on the collector surface wherein the peeling of the peelable layer comprises pressing down a peeler sheet, which comprises at least a thermoplastic resin layer, on an area of a surface of the active material layer overlapping with the peelable layer in a heating condition while facing the thermoplastic resin layer toward the active material layer to bond the thermoplastic resin layer of the peeler sheet to a portion of the active material layer disposed on the peelable layer, and peeling the peeler sheet from the collector surface together with the peelable layer and a portion of the active material layer disposed on the peelable layer to partially expose the collector surface, thereby forming the noncoated portion having a predetermined pattern on the collector surface.

2. A process for producing an electrode plate for a secondary battery as claimed in claim 1, wherein said peelable material is a thermoplastic resin comprises at least one resin selected from the group consisting of polyethylene and polypropylene.

3. A process for producing an electrode plate for a secondary battery as claimed in claim 1, wherein said peelable material has a melting point in a range of 100 to 250° C.

4. A process for producing an electrode plate for a secondary battery as claimed in claim 1, wherein said peelable material has a viscosity in a range of 100 to 50,000 cps in a molten state.

5. A process for producing an electrode plate for a secondary battery as claimed in claim 1, wherein said peeler sheet is a sheet made of thermoplastic resin.

6. A process for producing an electrode plate for a secondary battery as claimed in claim 1, wherein said peeler sheet comprises a substrate sheet and the thermoplastic resin layer disposed on the substrate sheet.

7. A process for producing an electrode plate for a secondary battery as claimed in claim 1, wherein said peeler sheet comprises a substrate sheet, the thermoplastic resin layer disposed on the substrate sheet and a wax layer disposed on the thermoplastic resin layer.

* * * * *